Dec. 11, 1951     F. L. DODGE     2,578,642
COLLET STRUCTURE
Filed Feb. 11, 1949
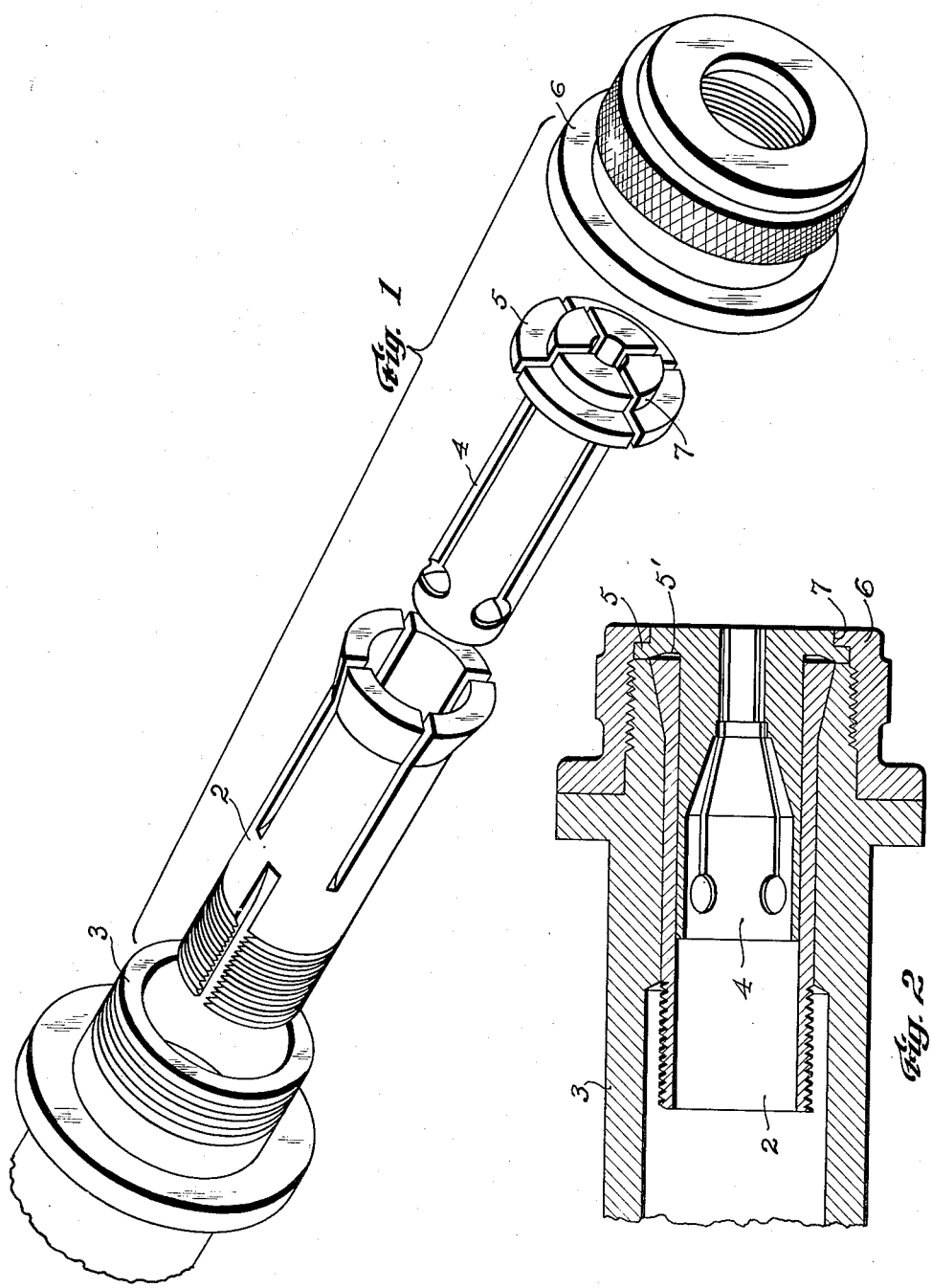
Floyd L. Dodge,
Inventor
by J. H. McReady,
Attorney.

Patented Dec. 11, 1951

2,578,642

UNITED STATES PATENT OFFICE 2,578,642

COLLET STRUCTURE

Floyd L. Dodge, Waltham, Mass., assignor to The Wade Tool Co., Waltham, Mass., a partnership Application February 11, 1949, Serial No. 75,855

3 Claims. (Cl. 279—49)

This invention relates to lathes, and particularly to the collet structure mounted in the spindle nose of the lathe to clamp the work to the spindle while the turning, threading, cutting off, or other machining operations are performed on it.

In those lathes in which means is provided for feeding stock automatically through the spindle between machining operations, a small error sometimes occurs in the feeding movement due to the axial movement of the collet itself. The present invention aims to devise means for preventing errors arising from this cause.

The nature of the invention will be readily understood from the following description when read in connection with the accompanying drawings, and the novel features will be particularly pointed out in the appended claims.

In the drawings,

Fig. 1 is an exploded perspective view of a collet assembly embodying the present invention; and Fig. 2 is a perspective sectional view showing the collet parts in their normal or operative relationship.

In Fig. 2 a master collet 2 of a common form, as better illustrated in Fig. 1, is shown mounted in its normal position in the spindle nose 3. Inside this collet is a collet sleeve 4, fitting snugly, the main body of the sleeve, forward of its rearward end, being slotted longitudinally to give it radial flexibility. This slotted portion of the sleeve is mounted directly inside the slotted part of the collet 2 which is that portion that expands and contracts in the normal operations of clamping and releasing the work. The bore of the sleeve is large enough to permit the stock on which the machine is operating to be fed freely through it, and when the collet is drawn backwardly and its fingers are forced radially inward by their engagement with the tapered portion of the spindle bore in which they are positioned, the contracting action of the collet is transmitted through the sleeve to the bar and clamps the latter securely to the spindle.

At the forward end of the collet sleeve 4, it is provided with a circular flange 5 lying between parallel planes positioned at right angles to the axis of the collet, this flange being of such radius as to overlie the end of the collet and to fit snugly into the space between the end face of the spindle and the inner end surface of the spindle cap 6. Sufficient clearance or "play" should be provided for the flange 5 to allow it to expand and contract freely, but this clearance usually need not be more than one or two thousandths of an inch. For this reason, also, a slight clearance 5' is provided between the end of the collet and the adjacent rear surface of the flange 5.

In the particular construction shown the flange is thickened at the central portion thereof in order to stiffen this end of the sleeve, a shoulder 7 separating the thinner and thicker sections of the sleeve head. The inner surface of the cap 6 is of complemental shape, as clearly shown in Fig. 2.

It will be observed that with this arrangement the work-clamping pressure applied by the collet through the sleeve 4 cannot move the sleeve either forward or backward in the spindle nose structure. In other words, the collet sleeve is held in a fixed axial position in the spindle nose and cannot move appreciably either forward or backward. Consequently, the work-clamping and releasing movements of the collet do not transmit to the work piece held by it any movement affecting the accurate positioning of the piece. The invention therefore effectually prevents errors in the positioning of the work which occur in lathes of the prior art constructions.

While I have herein shown and described a preferred embodiment of my invention, it will be evident that the invention is susceptible of embodiment in other forms without departing from the spirit or scope thereof.

Having thus described my invention, what I desire to claim as new is:

1. In a lathe, the combination with a spindle and a collet mounted in said spindle, of a sleeve fitting in said collet and in which the stock to be operated upon is positioned, said sleeve being radially expansible and contractible with the action of said collet, whereby when the collet is contracted to grip the work it contracts the sleeve upon the work and secures the latter in a fixed position in the spindle, said sleeve having a flange at the forward end thereof extending laterally into a position between the forward end of said spindle and the spindle cap, whereby these parts cooperate with the flange to hold the sleeve in a fixed axial position in said spindle.

2. In a lathe, the combination with a spindle and a collet mounted in said spindle, of a sleeve fitting in said collet and in which the stock to be operated upon is positioned, said sleeve being slotted longitudinally to give it radial flexibility, and the slotted portions of the sleeve being positioned snugly inside the expansible and contractible portion of the collet, said sleeve having a flange extending radially from its forward end, the flange having slots therein registering with those in the sleeve, said flange being positioned between the end of the spindle and the spindle cap and held by them in a fixed axial position in the spindle structure.

3. A collet sleeve comprising an elongated tubular body slotted longitudinally to give it radial flexibility, and a disk-like head extending radially from the forward end of said head, said head comprising an axially thickened portion adjacent to the body and a thin rim extending radially from said thickened portion, said head being slotted correspondingly to the body.

FLOYD L. DODGE.

REFERENCES CITED

The following references are of record in the file of this patent:

UNITED STATES PATENTS

| Number | Name | Date |
|---|---|---|
| 811,722 | Hoenscheid | Feb. 6, 1906 |
| 2,098,675 | Procunier | Nov. 9, 1937 |
| 2,272,185 | Chittenden | Feb. 10, 1942 |
| 2,449,887 | Edel et al. | Sept. 21, 1948 |